J. P. Jones,

Muff Box.

No. 4313. Reissued Mar: 28. 1871.

Witnesses:

Theodore H. Ward

Nathaniel Lyon

James P. Jones Inventor:

N. PETERS, PHOTO-LITHOGRAPHER, WASHINGTON, D. C.

United States Patent Office.

JAMES P. JONES, OF BLOOMFIELD, NEW JERSEY, ASSIGNOR TO JASON CRANE, OF SAME PLACE.

Letters Patent No. 96,118, dated October 26, 1869; reissue No. 4,313, dated March 28, 1871.

IMPROVEMENT IN MUFF AND COLLAR-BOXES.

The Schedule referred to in these Letters Patent and making part of the same.

*To all whom it may concern:*

Be it known that I, JAMES P. JONES, of Bloomfield, in the county of Essex and State of New Jersey, have invented a new and useful Improvement in the Mode of Packing Furs; and do hereby declare that the following is a full, clear, and exact description thereof, which will enable others skilled in the art to make and use the same.

Prior to my invention, furs, such as muffs and collars, were packed separately—that is to sav, the muff was placed in a cylindrical-shaped box, and the collar in a rectangular-shaped box. By reason of such mode of packing, two boxes very dissimilar to each other had to be resorted to for holding and preserving a set of furs.

By my improved mode, namely, the making of a single box having two suitable compartments combined therein in any convenient or desired way, the inconvenience arising by reason of separate packing and handling is avoided.

In this improved arrangement the muff and collar respectively find their receptacle without pressing, bruising, or creasing one another, which would not be the case if a plain or box of the ordinary construction was used.

In the transportation of furs by dealers this improvement or combination box is of great importance, as it saves freight, and matched furs are thus better kept together.

The annexed drawing will serve to illustrate one arrangement of the combination, or one way in which my invention may be carried out—

Figure 1:
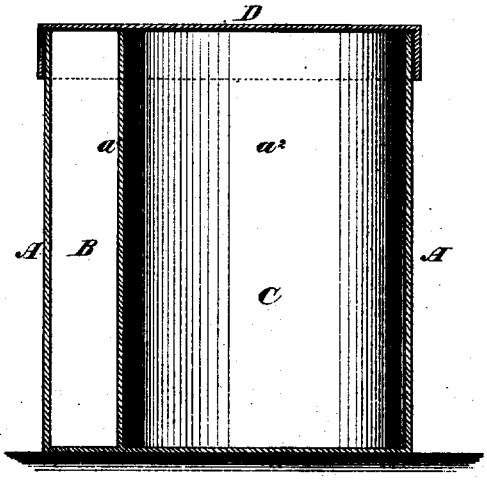
Figure 2:
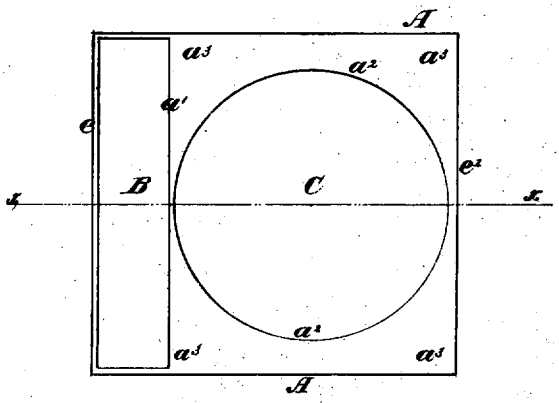

Figure 1 of which represents a central vertical section taken in the line $x\ x$, fig. 2.

Figure 2 is a plan view of the same, the cover being removed to show the inside.

A is the box.

B is one of the compartments in the same.

C is the other one.

D is the cover.

$a^1$ is a partition.

$a^2$ is a cylindrical-formed partition, by means of which compartment C is made.

$a^3$ is a mat or support for partition $a^2$.

$e$ is one end of the box.

$e'$ is the other end of the same.

The box A is made of paper or pasteboard, in the form of a cube, of sufficient size to contain a lady's fur muff and collar, or of any desired size.

Within said box and secured to the bottom and sides of the same, and at a suitable distance from one end of the box A, as shown in the drawing, so as to leave room to contain a lady's fur cape or collar when the same is folded up, is a partition, $a^1$, which, with the end of the box $e$, forms the compartment B.

Between the partition $a^1$ and the end $e'$ of the box A, and of a diameter equal to the distance from the partition $a^1$ to the end $e'$, is a cylindrical hollow tube, $a^2$, made of pasteboard, which said tube $a^2$ forms the hollow cylindrical compartment C.

Upon the top of the tube $a^2$ is a mat or support, $a^3$, secured by paste to the sides of the box A, and having a circular hole in the center of the same equal in diameter to the diameter of the tube $a^2$, into which hole in said mat or support $a^3$ the top of tube $a^2$ is pasted or otherwise secured so as to support said tube in a vertical position, and so as, also, to cover neatly all the inside of the said box A except the compartments C and B.

Said box A is provided with a suitable cover, D, by means of which the whole is covered up and kept from insects and dust.

I claim as new—

The combination, in a fur-set box, of a cylindrical compartment with a rectangular compartment, substantially as described.

JAMES P. JONES.

Witnesses:

NATHANIEL LYON,

CARLISLE NORWOOD, Jr.